Figure 1:
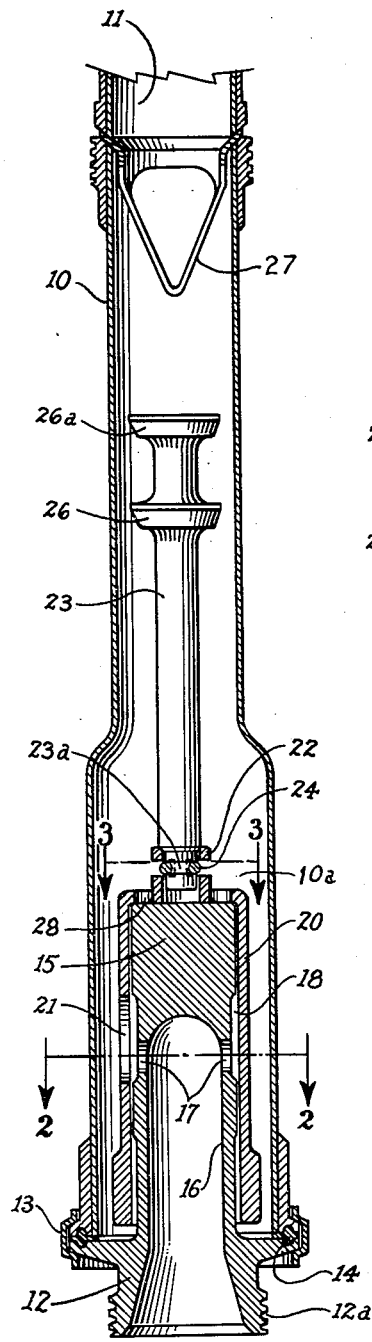

INVENTORS
Kurt Nelson
Walter A. Scott

3,117,590
AUTOMATIC FLOW REGULATOR
Kurt Nelson and Walter A. Scott, Poughkeepsie, N.Y., assignors to The De Laval Separator Company, Poughkeepsie, N.Y., a corporation of New Jersey
Filed Aug. 31, 1960, Ser. No. 53,178
5 Claims. (Cl. 137—504)

This invention relates to flow regulators and has particular reference to an improved regulator for automatically maintaining a substantially constant rate of fluid flow in a closed system.

There are many instances in which it is desired to supply a liquid through a closed system under pressure at a constant flow rate, despite variations in the feed pressure or back pressure in the system. An example is a system including one or more centrifugal separators of the hermetically closed type fed through a supply pipe line from a supply tank, as by means of a centrifugal pump. In this instance, it is necessary to maintain the supply of liquid at a substantially constant predetermined flow rate in order to provide good operating efficiency of the centrifuge or centrifuges. Thus, if one of two centrifuges fed by the supply line should be shut down, thereby increasing the back pressure on the supply line, the other separator will not operate at peak efficiency unless some measure is taken to counteract the resulting change in the pressure drop across this centrifuge.

Various attempts have been made heretofore to provide means for automatically regulating the flow of liquids through closed systems such as that described above, in order to maintain a substantially constant rate of flow. These prior attempts, insofar as we are aware, have not been successful, either because the regulating apparatus has been too complicated and expensive for most purposes or because it has been unreliable in operation.

The principal object of the present invention is to provide an automatic regulator for maintaining a substantially constant rate of flow in a closed system and which is simple in construction and reliable in operation.

A regulator made according to the invention comprises a housing having a fluid outlet, and a slide valve forming a fluid inlet passage leading into the housing, the housing defining a throughflow chamber interconnecting the inlet passage and the outlet. The slide valve includes a pair of telescoping members having a loose sliding fit, one of these valve members being fixed to the housing and the other valve member being slidable in the direction of flow through the chamber to gradually reduce the throughflow area of the inlet passage, the slidable valve member being biased by a substantially constant force in the direction opposite to the flow direction and toward a fully open position in which the inlet passage has a maximum throughflow area. A movable disc is located in the housing chamber and has a surface against which fluid from the inlet passage is adapted to impinge in flowing to the outlet, thereby urging the disc in the flow direction against the constant biasing force, the disc and the surrounding wall of the chamber forming a generally annular throughflow space in the chamber. Means are provided for connecting the slidable valve member to the disc for movement therewith in the two directions noted above.

With this construction, the biasing force on the slidable valve member holds the latter in its fully open position when the flow rate through the inlet passage is relatively low or zero. However, as the liquid flows at increasing rate through the inlet passage and thereby impinges on the disc with greater force, the disc moves the slidable valve member in the direction to reduce the throughflow area of the inlet passage, until the movable parts are in a state of balance in which the constant biasing force tending to increase the throughflow area of the inlet passage is equal to the force exerted by the throughflowing liquid on the disc and tending to reduce this throughflow area. The rate of flow corresponding to this equilibrium position will depend upon the magnitude of the constant biasing force and the effective area of the disc against which the fluid impinges in flowing through the housing, as well as the ratio of this area to the throughflow area of that portion of the housing chamber in which the disc is movable.

An important feature of the new regulator, and one on which its successful operation depends, resides in the disc being operatively connected to a slide valve of the type described and the provision of the loose sliding fit between the telescoping parts of the slide valve. A valve of this construction imposes negligible resistance to movements of the sliding valve member for varying the throughflow area of the inlet passage; and the loose sliding fit prevents binding of the slidable valve member on the fixed valve member while permitting liquid from the inlet passage to enter the small clearance between the telescoping valve members and form a lubricating film. Preferably, the disc is connected to the slidable valve member through a rod which is adapted to tilt relative to the slidable valve member, as in this way binding of the valve members is prevented because the disc can move laterally in the housing chamber without acting to tilt the slidable valve member relative to the fixed valve member. Normally, the flow of fluid through the housing chamber and around the disc acts to center the disc in the annular space between the latter and the surrounding wall of the housing chamber.

In the preferred construction, the fixed valve member projects into the housing toward the outlet and is surrounded by the slidable valve member, the latter forming with the surrounding wall of the housing a substantially annular space; and the fixed valve member has an external annular groove forming part of the inlet passage and located adjacent generally longitudinal slots in the slidable valve member, these slots also forming parts of the inlet passage. Thus, as the slidable valve member moves from its fully open position toward the outlet, the slots therein form a progressively decreasing throughflow area through which the fluid can pass into the housing chamber from the annular groove in the fixed valve member. To permit the regulator to accommodate different throughflow rates which are to be maintained substantially constant, the disc is releasably connected to the slidable valve member so that the disc can be replaced with one of larger or smaller diameter.

Figure 2:
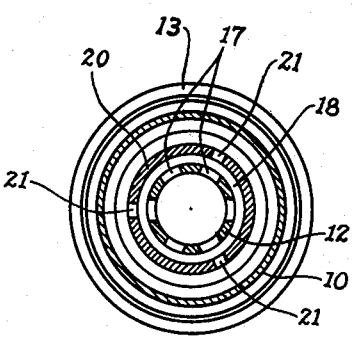
Figure 3:
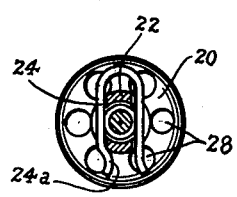
Figure 4:
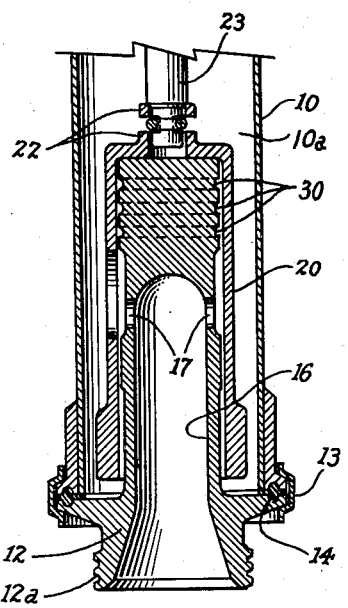

For a better understanding of the invention, reference may be had to the accompanying drawings, in which FIG. 1 is a vertical sectional view of a preferred form of the new flow regulator, showing the slide valve in its fully open position;

FIGS. 2 and 3 are sectional views on the lines 2—2 and 3—3, respectively, in FIG. 1; and FIG. 4 is a vertical sectional view of the lower portion of a modified form of the regulator.

Referring to FIGS. 1–3, the regulator there shown comprises a housing 10 in the form of a vertical pipe which is enlarged at its lower portion, the upper end of the housing being open to form a liquid outlet 11. A hollow fitting 12 is releasably secured to the housing at its lower end, by means of a releasable clamp 13 engaging external flanges on the housing and the fitting. An annular gasket 14 is inserted between the opposing faces of these flanges to form a liquid-tight seal when the parts are clamped together by the clamp 13.

The fitting 12 has a generally cylindrical stem portion 15 projecting upwardly into the housing in spaced relation to the surrounding wall of the housing. The hollow interior 16 of this fitting forms a chamber opening through the bottom of the fitting and terminating at its upper end well below the top of the stem portion 15. At its upper portion, the fitting chamber 16 communicates through lateral holes 17 with an annular groove 18 formed in the outer wall of stem portion 15. As shown in FIG. 2, there are six holes 17 spaced equidistantly around the upper portion of chamber 16 and leading into the lower portion of the annular groove 18, which forms an annular flow channel.

The fitting 12—18 forms in effect a stationary or fixed valve member coacting with a slidable valve member 20. The latter is of generally cylindrical form, open at the bottom, and receives the fixed valve member 15 with a loose sliding fit. Intermediate its ends, the slidable valve member 20 has vertical slots 21, there being three of these slots spaced equidistantly around the member 20 as shown in FIG. 2. The slots 21 correspond in length to the width of the annular groove 18; and when the slidable valve member 20 is in its lowermost position, with its upper end resting on top of the stem portion 15, the upper and lower ends of slots 21 are opposite the upper and lower edges, respectively, of the annular groove 18, as shown in FIG. 1.

As will be apparent from the foregoing, the chamber 16, holes 17, groove 18 and slots 21 form inlet passages leading into the lower portion of housing 10, and these passages will have their maximum throughflow areas when the slidable valve member 20 is in its lowermost position shown in FIG. 1. However, as the member 20 is raised relative to the fixed valve member or stem 15, the total throughflow area of these inlet passages will be gradually reduced due to the fact that the vertical slots 21 will each have a progressively decreasing length in registry with the annular groove 18. Thus, the telescoping members 15 and 20 constitute a slide valve forming fluid inlet passages leading into the housing, which passages are variable as to total throughflow area by vertical movements of the slidable valve member 20. The fitting 12 is externally threaded at its lower portion, as shown at 12a, so that it can be connected to a supply pipe (not shown) from which liquid can be fed into the housing through these inlet passages; and the housing 10 forms a chamber 10a interconnecting these inlet passages with the housing outlet 11.

The slidable valve member 20 is provided at its upper end with a central hollow boss 22 which loosely receives the reduced lower end portion of a vertical rod 23. The hollow boss 22 is cut away at opposite sides, substantially below its upper end, to receive the legs of a U-shaped spring clip 24, these legs being engaged in an annular groove 23a in the reduced lower portion of rod 23. The clip 24 thus forms a releasable means for connecting the rod 23 to the slidable valve member 20 so that these parts will move with each other vertically in the housing. One of the legs of the clip 24 is provided at its end portion with a detent 24a to prevent accidental withdrawal of the clip from the rod groove 23a.

At its upper end portion, the rod 23 carries a circular disc 26, which may be integral with the rod. As shown in FIG. 1, a similar disc 26a is carried by the rod above the disc 26 but in spaced relation thereto. The discs 26—26a are substantially smaller in diameter than the internal diameter of the upper portion of the housing 10. This upper portion of the housing is of uniform internal diameter, so that there will be a uniform clearance space around the discs 26—26a throughout their range of vertical movements in the housing. Upward movement of the slidable valve member 20 and rod 23 is limited by engagement of the upper disc 26a with a perforated stop 27 secured in the housing at its upper portion.

The upper end of slidable valve member 20 is ported by means of a series of holes 28, for a purpose to be described presently. As shown in FIG. 3, there are six holes 28 spaced equidistantly around the hollow boss 22.

Still referring to FIGS. 1–3, assume that a milk pipe line including a centrifugal pump (not shown) is connected to the regulator inlet through the fitting 12 and that the regulator outlet 11 is connected through a pipe to a centrifugal separator of the hermetically closed type (not shown) which is to be supplied with milk at a rate of 15,000 lbs. per hour to provide good operating efficiency of the centrifuge. Before the milk is fed to the regulator, the slidable valve member 20 is in its lowermost or fully open position to which it is biased by the weight of the parts 20—26a. In other words, the action of gravity serves as a constant force biasing these movable parts toward the fully open position of the slide valve. When the feed of milk to the regulator is started under the action of the centrifugal pump, the milk will flow through the regulator and toward the centrifuge inlet at a rate which builds up toward the desired rate, the milk issuing from the slots 21 first filling the lower portion of chamber 10a and then passing through the clearance space around the discs 26—26a and through the regulator outlet 11 to the centrifuge inlet. At some point during this build-up of the flow rate, the force of the upwardly flowing milk impinging on the lower surface of the discs 26—26a will be sufficient to overcome the constant biasing force which urges the parts 20—26a toward their lowermost positions, whereupon the slidable valve member 20 will be raised so as to reduce the total throughflow area of the inlet slots 21. This upward movement of the parts, with consequent reduction of the total throughflow area of the inlet passages, will continue until the flow rate reaches the desired value of 15,000 lbs. per hour, at which time the upward force of the milk exerted on the movable parts including discs 26—26a will equal the constant downward biasing force on the movable parts so that a state of equilibrium is reached. The movable parts will then "float" in their equilibrium positions (as long as the pressures at the inlet and outlet of the regulator remain constant) so as to maintain the desired flow rate through the partially restricted inlet slots 21.

If the flow rate should increase above the desired value, as due to a decrease in the back pressure at the regulator outlet or an increase in the feed pressure at the regulator inlet, the resulting increase in the upward force of the liquid impinging on the lower surfaces of discs 26—26a will raise the valve member 20 further so as to further reduce the effective total throughflow area of the inlet slots 21, thereby reducing the throughflow rate to the desired value and establishing a new equilibrium position of the movable parts if the decreased back pressure or increased feed pressure persists. Conversely, an increase in back pressure at outlet 11 or a decrease in the feed pressure at inlet fitting 12, resulting in a decrease of the flow rate from the desired value, will reduce the force of the upwardly flowing milk impinging on the discs 26—26a and cause a lowering of the movable parts 20—26a with a consequent increase in the total throughflow area of the inlet slots 21, until the flow rate increases to the desired value.

It will be observed from the foregoing that the regulator automatically maintains a substantially constant flow rate despite a change in the back pressure at outlet 11 or a change in the feed pressure at the inlet fitting 12. Such a pressure change, resulting in a variation of the flow rate through the regulator, will immediately cause a raising or lowering of the movable parts 20—26a and a corresponding change in the effective total throughflow area of the inlet slots 21 until the movable parts reach a new equilibrium position which restores the desired throughflow rate and which corresponds to the new conditions imposed by the aforementioned pressure change tending to increase or decrease the flow rate from its desired value. During this operation of the regulator, the movable parts 20—26a are highly sensitive to changes in the flow rate and can readily move vertically to different positions for maintaining the desired flow rate as described, because there is negligible friction between the valve members 15 and 20. More particularly, the loose connection of rod 23 to valve member 20, provided by the spring clip 24, permits the discs 26—26a to move laterally to a certain extent in the housing chamber (incident to centering themselves in the stream of milk flowing upward through this chamber) without tilting the slidable valve member 20 relative to the fixed valve member 15, which would cause a binding action between these parts. In other words, because of the flexibility of spring clip 24 and also its loose fit in the parts which receive it (FIG. 4), the discs 26—26a are loosely connected to slidable valve member 20 through connecting means including the rod or element 23 which is tiltable laterally in all directions relative to slidable valve member 20 to prevent such binding action. Also, the loose sliding fit between the telescoping valve members 15 and 20 serves to prevent binding of these parts and provides for a film of milk between these parts which serves as a lubricant. For this purpose, a difference of 0.15 mm. between the external diameter of fixed valve member 15 and the internal diameter of slidable valve member 20 has been found to provide the desired looseness of fit. Because of the annular groove 18, there is no need to provide means for preventing rotation of slidable valve member 20 relative to fixed valve member 15, which means would tend to restrict the freedom of movement of the movable parts 20—26a. That is, any rotation of valve member 20 relative to valve member 15 is of no consequence because the inlet slots 21 will always be in direct communication with the annular groove 18.

It has been found that operation of the regulator is greatly improved by providing the series of holes 28 in the upper end of slidable valve member 20. Without these holes, apparently milk flowing upwardly from the inlet groove 18 through the small clearance space between the valve members 15 and 20 builds up a pressure against the top of member 20, due to inability of the milk to escape freely enough through the clearance space between the rod 23 and the surrounding hollow boss 22, and this build-up of pressure tends to result in false actuations of the movable parts 20—26a. However, by porting the top of member 20 with a substantial number of holes 28, the milk can flow relatively freely in the upward direction between the valve members 15 and 20 and out through the holes 28, thereby preventing any possible impairment of the desired movements of the parts 20—26a.

The regulator shown in FIGS. 1–3 is particularly adapted for uses in which there is a relatively low minimum pressure drop across the regulator and in which the flow rate does not exceed about 20,000 lbs. per hour. In cases where the flow rate exceeds this value, with a relatively high minimum pressure drop across the regulator, the modification shown in FIG. 4 is preferred. As shown in FIG. 4, the regulator is identical to that illustrated in FIGS. 1–3 except that the holes 28 are omitted and instead a series of annular grooves 30 is provided in the periphery of the fixed valve member 15 at its upper portion. Thus, the grooves 30 form a labyrinth between the upper portions of the valve members 15 and 20 which serves to greatly restrict the flow of milk upwardly between these members from the inlet groove 18 toward the clearance space between rod 23 and the surrounding boss 22. With the greater flow rates through the regulator, the holes 28 of FIG. 1 are apparently insufficient to allow the milk to escape rapidly enough from the clearance space between the valve members 15 and 20 to prevent the undesirable action previously described. In the FIG. 4 embodiment, this difficulty is overcome by adopting the substantially opposite expedient of preventing milk from reaching the underside of the top of valve member 20 at a rate such that it cannot escape freely through the hollow boss 22. The grooves 30 constituting the labyrinth can be formed in either the inner valve member 15 or the outer valve member 20, but in either case it serves to prevent any substantial leakage of milk upwardly through the small clearance space between the upper portions of the members 15 and 20.

In the use of either of the illustrated forms of the new regulator, the pressure at the inlet fitting 12 should be at least 5 lbs. per square inch greater than the pressure at the inlet of the centrifuge or other apparatus to be fed through the regulator. An increase in this pressure differential will not adversely affect the regulator operation, but any substantial decrease in this pressure differential will cause improper operation of the regulator through failure to maintain the desired throughflow rate.

An example of the dimensions of a regulator made according to FIGS. 1–3, for maintaining a fixed flow rate of 15,000 lbs. of milk per hour with a minimum pressure drop of about 5.5 lbs. per square inch across the regulator, is as follows: The reduced upper portion of housing 10 has an internal diameter of 47.8 mm., the discs 26—26a each have an external diameter of 39.15 mm., the enlarged lower portion of housing 10 has an internal diameter of 73.0 mm., the valve member 20 has an external diameter (exclusive of its enlarged lower portion) of 49.0 mm. and an internal diameter of 44.5 mm., the stem portion 15 of the fixed valve member has an external diameter of 44.35 mm., each of the three inlet slots 21 has a length of 36.0 mm. and a width of 4.7 mm., and the parts of the inlet passage leading up to these slots provide a substantially greater throughflow area than the slots when fully exposed. The height of the enlarged lower portion of housing chamber 10a is about 190 mm. and the height of the slidable valve member 20 is about 130 mm. exclusive of the hollow boss 22.

The flow rate to be maintained constant by the regulator can be readily varied by replacing the discs 26—26a with discs of larger or smaller diameter. Such replacement can be effected easily by removing the lower clamp 13, withdrawing the parts 12 and 20 from the housing, detaching the rod 23 from part 20 by withdrawing the spring clip 24, connecting a new rod 23 (with discs 26—26a of the desired different size) to valve member 20 by replacing the spring clip 24, and reassembling the parts in the housing. Discs 26—26a of larger diameter will cause a lowering of the flow rate to be maintained constant by the regulator. For instance, in the example given above, where the flow rate is fixed at 15,000 lbs. per hour with discs 26—26a having a diameter of 39.5 mm., discs having a diameter of 41.7 mm. will maintain a flow rate of 10,000 lbs. per hour and discs having a diameter of 36.6 mm. will maintain a flow rate of 20,000 lbs. per hour. For the flow rates of 10,000 and 20,000 lbs. per hour, the minimum pressure drop across the regulator should be 2.5 and 10 lbs. per square inch, respectively. To maintain a flow rate of 25,000 lbs. per hour with the FIG. 4 embodiment, discs 26—26a having a diameter of 34.4 mm. are used, and the minimum pressure drop across the regulator should be 15 lbs. per square inch. In all of these examples, the rod 23 is assumed to have a diameter of 16 mm.

While we have described the operation of the regulator in connection with the supply of milk to a centrifuge, it is to be understood that the regulator is adapted for other uses as well.

We claim:

1. An automatic flow regulator comprising a housing having a fluid outlet, a slide valve forming a fluid inlet passage leading into the housing, the housing defining a throughflow chamber interconnecting said inlet passage and outlet, the slide valve including a pair of telescoping members having a loose sliding fit, one of said valve members being fixed to the housing, the other valve member being slidable in the direction of flow through the chamber to gradually reduce the throughflow area of the inlet passage, said slidable member being biased by a substantially constant force in the direction opposite to said flow direction and toward a fully open position in which said passage has a maximum throughflow area, a movable disc located in said chamber and against which fluid from the inlet passage is adapted to impinge in flowing to said outlet, thereby urging the disc in said flow direction against said biasing force, the disc and the surrounding wall of the chamber forming a generally annular throughflow space in the chamber, and means connecting the slidable valve member to the disc for movements therewith in said directions, whereby the throughflow area of the inlet passage is reduced as the fluid therefrom impinges on the disc with greater force, said connecting means forming a loose connection and including an element tiltable laterally in all directions relative to said slidable valve member to permit lateral movements of the disc in all directions in said annular throughflow space and thereby prevent binding of the slidable valve member on the fixed valve member, the slidable valve member being freely rotatable relative to the fixed valve member, said fixed valve member having an annular groove forming part of said inlet passage.

2. A regulator according to claim 1, in which said fixed valve member projects into the housing toward the outlet, the slidable valve member surrounding the fixed valve member and forming with the surrounding wall of the housing a substantially annular space.

3. A regulator according to claim 1, in which said element of the connecting means is a rod releasably secured to the slidable valve member.

4. A regulator according to claim 1, in which the slidable valve member surrounds the fixed valve member, the slidable member also having an end facing the disc and ported to permit free escape of fluid flowing from the inlet passage along said loose fit between the members.

5. A regulator according to claim 1, in which the slidable valve member surrounds the fixed valve member, the slidable member also having a substantially closed end facing the disc, one of said members forming a labyrinth in said loose fit between the members, the labyrinth being located between the inlet passage and said substantially closed end.

References Cited in the file of this patent

UNITED STATES PATENTS

| | | |
|---|---|---|
| 400,173 | Bell | Mar. 26, 1889 |
| 829,669 | Porter | Aug. 28, 1906 |
| 1,087,906 | Houghton | Feb. 17, 1914 |
| 2,584,418 | Branson | Feb. 5, 1952 |
| 2,800,919 | Kates | July 30, 1957 |